March 23, 1954  C. E. HITTLE  2,673,041
TAPE OR FILM ROLL DRIVING MECHANISM
Filed June 29, 1951  2 Sheets-Sheet 1

INVENTOR.
Carl E. Hittle
BY
ATTORNEY.

March 23, 1954  C. E. HITTLE  2,673,041
TAPE OR FILM ROLL DRIVING MECHANISM
Filed June 29, 1951  2 Sheets-Sheet 2
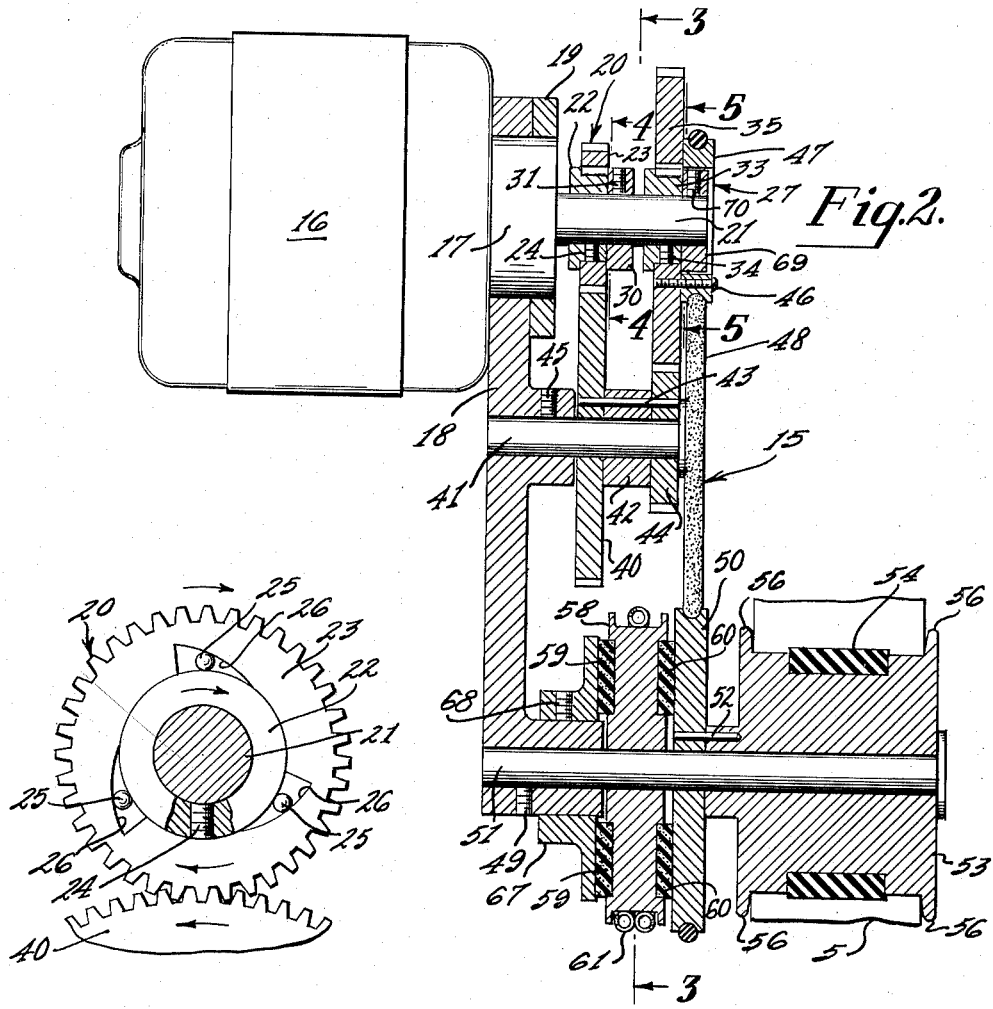
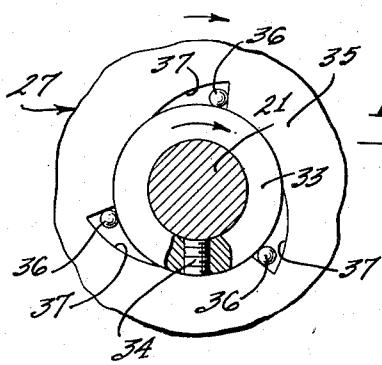
INVENTOR.
Carl E. Hittle
BY
ATTORNEY.

Patented Mar. 23, 1954

2,673,041

UNITED STATES PATENT OFFICE 2,673,041

TAPE OR FILM ROLL DRIVING MECHANISM

Carl E. Hittle, North Hollywood, Calif., assignor to Radio Corporation of America, a corporation of Delaware Application June 29, 1951, Serial No. 234,218

11 Claims. (Cl. 242—55)

This invention relates to a drive mechanism, and particularly to a film reeling system for tape or film recording and reproducing apparatus, wherein the tape or film is wound on a roll at a certain speed and is rewound at a higher speed. The drive mechanism automatically shifts from the take-up roll to the supply roll and vice versa, and automatically changes the speed ratio when the drive is reversed.

Many forms of take-up film drives have been used for tape or film recorders and reproducers and film cameras, some of which automatically shift the drive from the take-up reel to the supply reel. One form of film reeling drive is disclosed and claimed in Jones co-pending U. S. application, Ser. No. 182,479, filed August 31, 1950. The present invention is of the direct drive type wherein the driving roller for reeling a tape or film is in direct contact with the outer turn of the roll. This form of reeling drive is disclosed and claimed in Pettus co-pending U. S. application, Ser. No. 193,110, filed October 31, 1950. The invention to be described utilizes a single contact roller which is automatically shifted from one film roll to another. When the drive roller is taking up film at the normal recording and reproducing speed, it is driven at one rate, and when shifted to the other roll for rewinding the film, it is driven at a higher rate, both the shifting and the change of speed being accomplished automatically.

The principal object of the invention, therefore, is to facilitate the reeling and rewinding of tape or film.

Another object of the invention is to provide an improved drive for taking up film or tape on a take-up roll and to rewind the film or tape on the supply roll.

A further object of the invention is to provide an improved automatic shifting film reeling drive which automatically shifts from one roll to the other and automatically varies the speed of the film driving roller.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is a cross-sectional view of the drive taken along the line 2—2 of Fig. 1.

Figure 3:
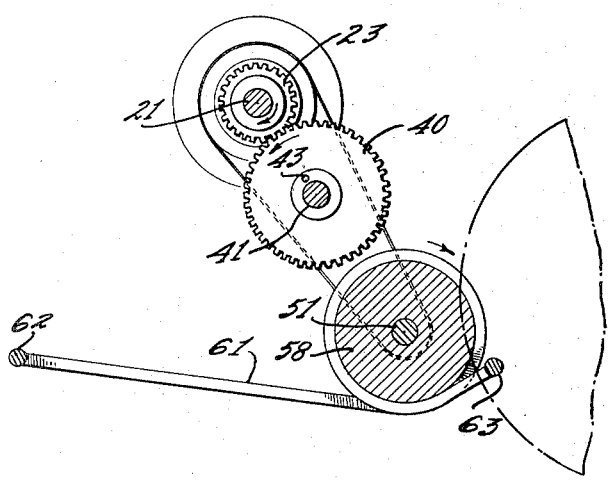

Fig. 3 is a detailed view of the drive connections taken along the line 3—3 of Fig. 2, and Figs. 4 and 5 are detailed views of the over-running clutch mechanisms taken along the lines 4—4 and 5—5, respectively of Fig. 2.

Figure 1:
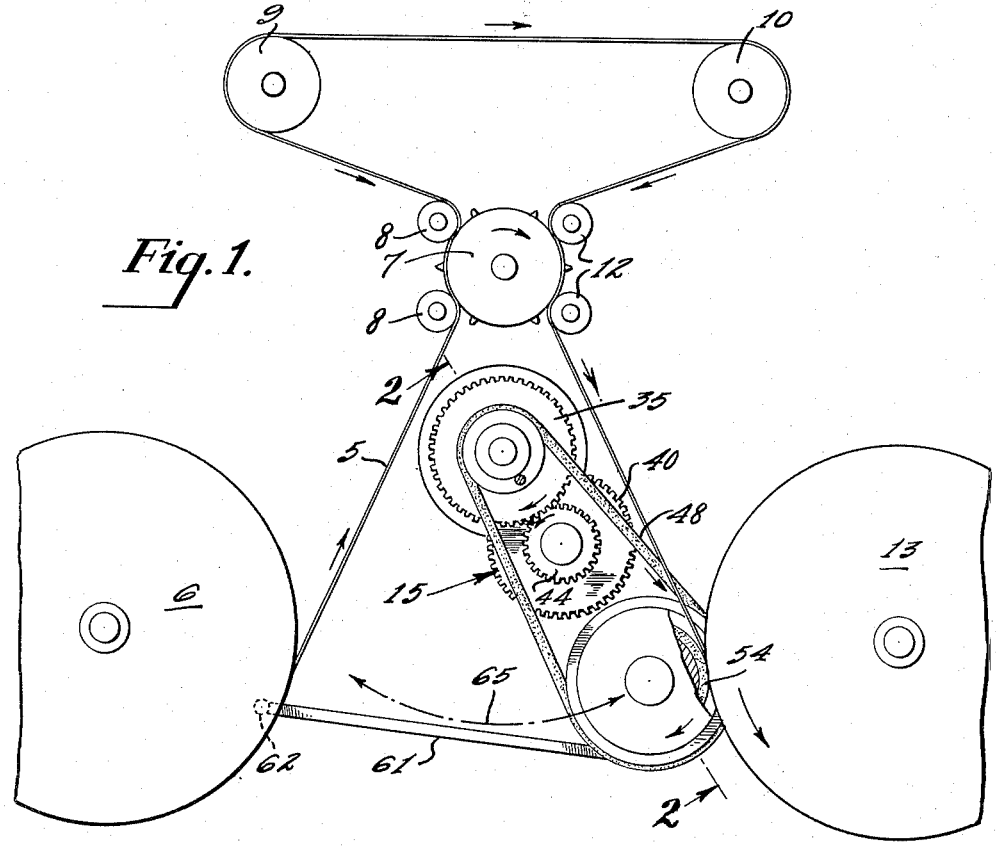
Fig. 1 is an elevational view showing the drive in a normal take-up position.

Referring now to the drawings, in which the same numerals identify like elements, a tape or film path for a sound recording or reproducing system is shown in Fig. 1. The tape or film 5, as shown by the arrows, is advanced from a supply roll 6 around the left-hand side of a sprocket 7, under pad rollers 8, around film stabilizing drums 9 and 10, over the right-hand side of sprocket 7 under pad rollers 12 to a take-up roll 13.

The film is taken up on roll 13 by a drive mechanism shown generally at 15, and which includes a constant speed and reversible motor 16 mounted in any suitable manner to the supporting panel of the mechanism. The right-hand end bell of the motor, as shown in Fig. 2, is provided with a projection 17 to form a pivot for a bracket 18, the bracket being held on the projection by a collar 19. On the driving shaft 21 of the motor is mounted the inner collar 22 of an over-running clutch 20, the outer portion 23 having gear teeth. (See Fig. 4.) The collar 22 is fixedly attached to the shaft 21 by a set screw 24. Clutch rollers 25 in tapered slots 26 provide the locking means.

Therefore, when the collar section 22 is driven, as shown by the arrow, the rollers 25 are advanced to the narrow ends of the slots 26 and the outer gear section 23 is rotated with section 22. Should the outer gear section 23 travel faster than the inner section 22, the two sections are disconnected. The section 23 is held in position on section 22 by a collar 30 having a set screw 31 therein.

Also mounted on the shaft 21 is a second over-running clutch 27, which is shown in Fig. 5, this clutch having an inner collar section 33 fixed to the shaft by a set screw 34, and an outer gear section 35. The section 35 is held in position on section 33 by a collar 69 having a set screw 70 therein. Rollers 36 are in slots 37, similar to rollers and slots 25 and 26, respectively, of clutch 20, and are shown in clutch 27, although it is to be noted that the tapers of slots 37 are reversed with respect to the tapers of slots 26. Thus, when the shaft 21 is rotated in the direction of the arrow, the same as shown in Fig. 4, no connection will be made between the sections 33 and 35, but when the shaft 21 is reversed, the gear section 35 will be driven by the shaft 21.

The gear 23 is in mesh with a large gear 40 rotatable on a shaft 41 held by set screw 45 in the bracket 18. Fixedly attached to the gear 40 by a collar 42 and pin 43, is a gear 44, which is thus rotatable with gear 40. The gear 44, which is much smaller than gear 40, is in mesh with the large gear section 35 of the over-running clutch 27 shown in Fig. 5. Thus, when the motor shaft 21 rotates, as shown in Fig. 4, the gear section 35 will be driven at a certain rate of speed, which is slower than the rotation of the shaft 21. There will be, therefore, no connection between the gear section 35 and the shaft 21 of clutch 27.

Mounted to the gear section 35 by screws, such as shown at 46, is a grooved pulley 47 having a belt 48 thereon. The belt 48 is also around a pulley 50 rotatable on a shaft 51 held by set screw 49 in the lower end of the bracket 18. The pulley 50 is pinned by a pin 52 to a film drive roller 53, which has a rubber tire 54 thereon to provide better frictional contact with the film 5. The roller 53 is flanged, as shown at 56, so that the film is guided into a smooth roll as it is wound on either roll 6 or 13.

Also mounted for rotation on the shaft 51, is a flanged pulley 58, which is provided with frictional pad members 59 and 60 on each side thereof. In one convolution around the pulley 58, is a spring belt 61, which has its ends anchored at points 62 and 63. (See Fig. 3.) Thus, rotation of the pulley 58 will rotate the bracket 18 on projection 17, as shown by the arced broken line arrow 65 in Fig. 1. The resiliency of the belt permits it to conform to the varying length of the path traveled by the pulley 58.

The operation of the drive will now be described. Assuming the recording and reproducing direction of the tape or film 5 is as shown by the arrows in Fig. 1, the motor 16 will be connected so as to rotate its shaft as shown by the arrows in the various figures. That is, the shaft 21 is turning in a clockwise direction, and will rotate gear section 23 in the same direction, gear 40 in a counterclockwise direction along with gear 44, and gear 35 in a clockwise direction. Thus, the belt 48 will be driven as shown by the arrow in Fig. 1, which will rotate the roller 53 in a clockwise direction to roll the film on the roll 13. By the reduction in speed of the shaft 21 through gears 40, 44, and 35, the film will be rolled on the roll 13 at the speed of advancement through the recorder or reproducer.

When it is desired to rewind the film from roll 13 to roll 6, it is off the sprocket 7 and simply passes between the two rollers or over a guide roller, not shown. To rewind the film, therefore, the motor 16 is simply reversed in direction, which drives the shaft 21 in a counterclockwise direction, opposite to that shown by the arrows in the various figures. The first action which takes place is that the frictional driven pulley 58 is reversed in direction, which will cause the bracket 18 to move in the arc shown at 65. This action shifts the roller 53 from the roll 13 to the roll 6. However, since the shaft 21 is now driven in a counterclockwise direction, a direct connection is obtained between the shaft 21 and the gear section 35, and the gear 35 will be driven at the same speed as the shaft 21. This will rotate the roller 53 at a high speed for rewinding the film on the supply roll 6. The pulley 58 may or may not remain stationary, depending upon the amount of friction between pads 59 and fixed friction collar 67 held on bracket 18 by set screw 68, or between pads 60 and pulley 61. The friction pads 59 and 60 are so adjusted as to provide only enough driving force to shift the bracket 18 between the two rolls.

There is thus provided an automatic shifting of the drive from one roll to the other and vice versa, and an automatic variation between the speed of taking up the tape or film and the speed of rewinding the tape or film simply by reversing the driving motor. Although one particular form of film path and film advancing mechanism has been illustrated and described, it is to be understood that the invention may be used with other forms of drives.

I claim:

1. A film reeling system for a pair of film rolls, comprising a reversible driving motor having a shaft, a gear train having one gear connected to said motor shaft when said motor rotates in one direction, and another gear of said train connected to said motor shaft when said motor rotates in the reverse direction, a roller for contacting said film rolls at mutually exclusive times depending upon the direction of rotation of said motor, a first interconnecting driving means between said roller and gear train for rotating said roller in a direction determined by the direction of rotation of said motor, a pulley, a second interconnecting driving means including said first interconnecting driving means between said pulley and gear train, and means connected to said pulley for shifting said roller from one of said film rolls to another when the rotational direction of said motor is reversed.

2. A film reeling system in accordance with claim 1, in which said gear train includes gears of different diameters, said roller for contacting said film rolls being driven at a higher speed when said motor rotates in one direction than when said motor rotates in the opposite direction.

3. A film reeling system in accordance with claim 1, in which a pair of over-running clutches are provided, one of said clutches connecting said one gear of said train to said motor shaft when said shaft rotates in one direction, and the other of said clutches connecting said other gear of said train to said motor shaft when said shaft rotates in the opposite direction.

4. A film reeling system comprising a driving shaft rotatable in two directions, a pair of gears mounted on said shaft, means for connecting one of said gears mounted on said shaft to said shaft when said shaft rotates in one direction and disconnecting said gear from said shaft when said shaft rotates in the reverse direction, means for connecting said other gear of said pair to said shaft when said shaft rotates in the direction that said first mentioned means disconnects said first mentioned gear from said shaft and for disconnecting said other gear from said shaft when said shaft rotates in the direction that said first mentioned means connects said one gear to said shaft, intermediate gears in mesh with said first pair of gears, a film roll drive roller, interconnecting driving means between one of said pair of gears and said roller, a member connected to said driving means, and elongated means connected to said member for shifting said roller from one position to another upon reversal of rotation of said shaft.

5. A film reeling system in accordance with claim 4, in which said member is a pulley and said elongated means is a belt around said pulley and having its ends attached at two separated positions, means being provided for frictionally connecting said driving means to said pulley.

6. A film reeling system in accordance with claim 4, in which a bracket is pivoted about the axis of said shaft, a shaft on said bracket on which said intermediate gears are rotatable, and a second shaft on said bracket on which said roller and pulley are rotatable.

7. A film reeling system in accordance with claim 6, in which said driving means includes a pulley attached to one of said pair of gears, a pulley connected to said roller, and a belt between said pulleys.

8. A film reeling mechanism for a pair of film rolls, comprising a reversible motor having a drive shaft, a bracket, means for pivoting one end of said bracket about the axis of said shaft, a pair of shafts extending from said bracket, one of said shafts being at the end of said bracket and the other of said shafts being intermediate said last mentioned shaft and said drive shaft, a pair of independent gears on said drive shaft, a pair of interconnected gears on said intermediate shaft, each of said intermediate gears being meshed with one of said pair of gears at all times, a single film drive roller on said end shaft, and driving means between said roller and one of said drive shaft gears for driving both of said film rolls at mutually exclusive times, depending upon the position of said bracket.

9. A film reeling mechanism in accordance with claim 8, in which a pulley is provided on said end shaft, together with frictional contact means between said pulley and said driving means.

10. A film reeling mechanism in accordance with claim 9, in which a belt having its ends fixed is wound around said pulley, said pulley and bracket being movable upon rotation of said pulley.

11. A drive for a pair of film rolls comprising a roller for contacting the outer turn of either one of two film rolls for winding film on each of said respective rolls, a pivoted bracket for supporting said roller at the end thereof, said bracket being pivoted to permit said roller to contact either of said film rolls, a motor having a shaft about the axis of which the other end of said bracket is pivoted, means including a pair of over-running clutches on said shaft for connecting said shaft with said roller for rotating said roller, and means including a pulley driven by said connecting means for moving said roller between film rolls upon reversal of said motor.

CARL E. HITTLE.

References Cited in the file of this patent

UNITED STATES PATENTS

| Number | Name | Date |
|---|---|---|
| 1,326,997 | Uebelmesser | Jan. 6, 1920 |
| 1,874,184 | Goldberg | Aug. 30, 1932 |
| 2,094,669 | Pratt | Oct. 5, 1937 |
| 2,139,784 | Wengel | Dec. 13, 1938 |
| 2,207,075 | Sperry | July 9, 1940 |
| 2,275,498 | Berndt | Mar. 10, 1942 |
| 2,464,135 | Hutchison, Jr. | Mar. 8, 1949 |